3,339,224
SPECTACLE HINGE CONSTRUCTION AND
METHOD FOR MAKING THE SAME
Francis B. Neary, Rochester, N.Y., assignor to Art-Craft
Optical Company, Inc., Rochester, N.Y. a corporation
of New York
Filed Sept. 8 1964, Ser. No. 394,665
13 Claims. (Cl. 16—128)

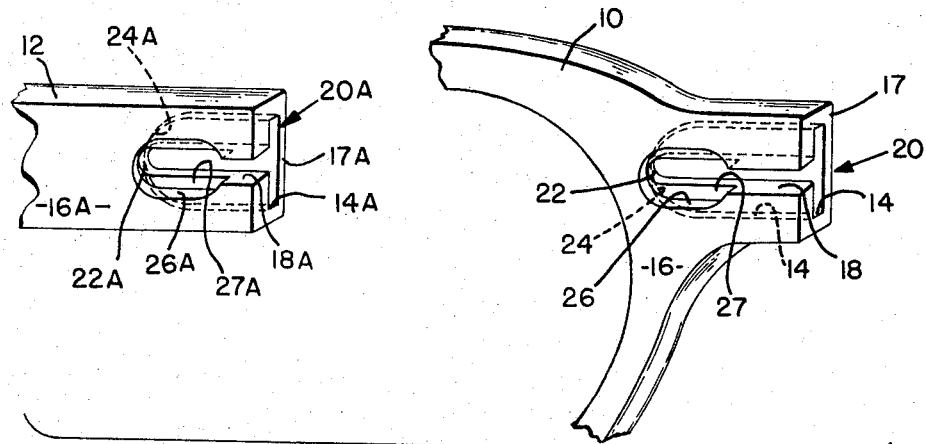
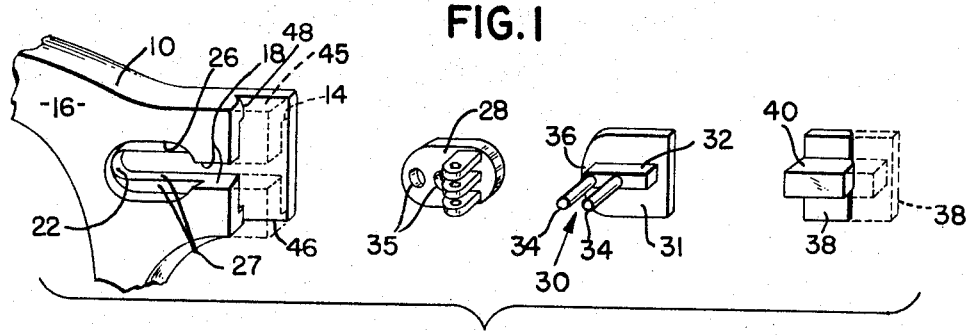
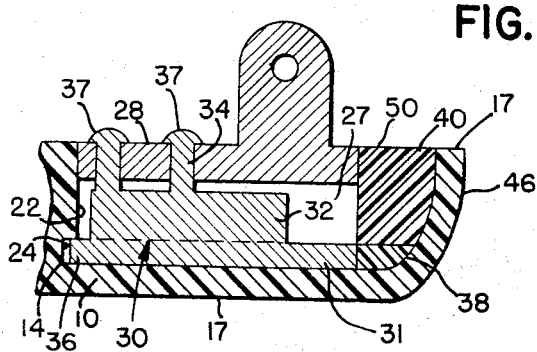
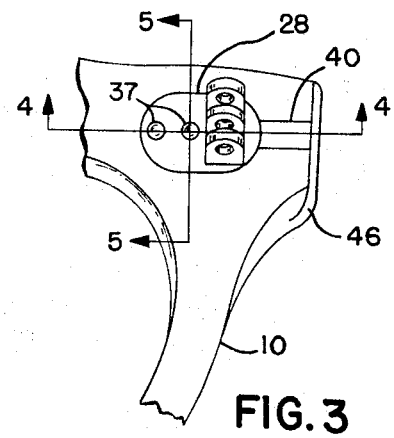
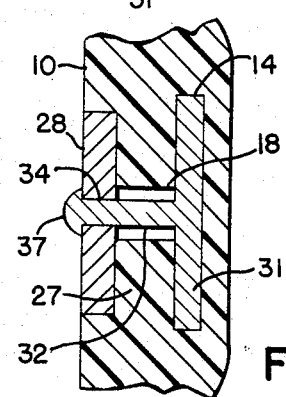
INVENTOR.
FRANCIS B. NEARY
ATTORNEYS United States Patent Office 3,339,224
Patented Sept. 5, 1967

This invention relates to an improved spectacle hinge construction and more specifically to an improved concealed spectacle hinge construction suitable for either the spectacle frame or spectacle temple.

While there are known concealed hinges, my invention provides a concealed hinge construction greatly improved in strength and other characteristics and a novel method for making the same. Therefore, it is generally an object of my invention to provide an improved concealed hinge construction for spectacles.

Known hidden or concealed hinge constructions comprise a hinge having a flange underlying the inner surface frame or temple in an undercut channel. The hinge is secured to the frame by a pair of screws to prevent displacement from the channel. With specific reference to temple constructions, the screws traverse the temple core, thereby greatly weakening the core itself. This does not provide a strong enough construction to withstand the heat applied to the plastic frames at the time lenses are inserted therein.

Moreover, normal use of such spectacles results in loosening of the screws. Due to lack of a completely satisfactory hidden hinge construction, commercially the older construction has dominated the field. Such older constructions provide a rivet or shield, the head of which is on the outer or front surface of the spectacle frame and rigidly secured to the hinge on the inner or back surface of the spectacle frame. However, this presents an exterior decorative or ornamental piece at each corner of the temple, and the spectacle frame is not aesthetically desirable, particularly for masculine spectacles.

My invention provides a completely suitable, concealed hinge construction greatly strengthened structurally over prior known constructions. My construction will provide a strong hinge even after heat is applied during insertion of the opthalmic lenses in the frame and will withstand normal use by the wearer thereafter.

Therefore, it is a further object of my invention to provide a stronger concealed spectacle hinge construction than heretofore known.

One of the primary objects of my invention is to provide an improved spectacle frame and temples free of ornamentation or embellishments on the exposed exterior surface of the frame.

My invention comprises a hinge, a hinge plate, an undercut channel formed at a terminal end of either the spectacle frame member or spectacle temple member. The undercut channel is adapted to receive the hinge plate. In order to secure the hinge and hinge plate in a rigid selected position relative to the channel, I provide means for locking the hinge to the spectacle frame or temple at the selected position by a keying arrangement on the inner surface thereof and interconnecting the hinge with the hinge plate in a manner applying compressional force therebetween to that portion of the temple or frame between the channel and the inner face thereof. Therefore, it is a significant object of my invention to provide a spectacle hinge construction of the nature just described.

In order to provide the above described construction, I have found that the preferred manner of construction is to provide an undercut substantially T-shaped slot and a substantially T-shaped in cross-section hinge plate to be received therein. The hinge plate is provided with a pair of rivets formed on the shank or leg of the T-shaped hinge plate. I provide a keyed recess in the inner face of the temple or frame for receiving the hinge in substantially flush relationship with the inner surface when the rivets of the T-shaped hinge plate traverse a pair of holes provided in the hinge. Therefore, it is a significant object of my invention to provide a spectacle hinge construction of the nature just described.

Other objects and advantages of this invention will be particularly set forth in the claims and will be apparent from the following description, when taken in connection with the accompanying drawings, in which:

FIG. 1 is an isometric partial view of one embodiment of my spectacle temple and frame with the hinge and hinge plate removed and the temple and frame in an incompleted state illustrating the undercut T-shaped slot and key recess;

FIG. 2 is an exploded isometric partial view of the FIG. 1 embodiment of the spectacle frame including the hinge and the concealed hinge plate and filler strips;

FIG. 3 is an isometric partial view of my FIG. 1 and FIG. 2 embodiment spectacle frame in finished form;

FIG. 4 is an enlarged cross-sectional view taken along the line 4—4 of FIG. 3 looking in the direction indicated by the arrows; and FIG. 5 is an enlarged sectional view taken along the line 5—5 of FIG. 3 looking in the direction indicated by the arrows.

My invention is particularly suitable for "plastic" spectacles. As used hereinafter, the term "plastic" will be construed to include Zylonite, celluloid, or any other type of moldable material suitable for spectacle construction. With reference to FIG. 1, I have illustrated a corner or end portion of a "plastic" spectacle frame 10 and of a spectacle temple 12; however, it will be understood that my temple and/or frame may be constructed of any suitable material. By machine milling, I provide undercut channels 14 and 14A extending substantially parallel to inner or back surfaces 16 and 16A of frame 10 and temple 12 respectively. As used hereinafter, it will be understood that the term "undercut channel" describes a channel or slot formed by machine milling, molding, or otherwise formed intermediate the front or outer surfaces 17 and 17A and back or inner surfaces 16 and 16A of the frame and temple I also provide transverse slots 18 and 18A transversely communicating with the undercut channels 14 and 14A thereby to define an inverted substantially T-shaped undercut slot generally referred to by the numerals 20 and 20A respectively.

The left-hand ends, as viewed in the figures, particularly FIG. 4, of transverse slots 18 and 18A terminate at 22 and 22A respectively short of the left-hand ends of undercut channels 14 and 14A terminating at 24 (FIG. 4) and as shown in broken line at 24 and 24A respectively in FIGS. 1 and 2.

I provide key recesses 26 and 26A formed by milling or otherwise in the inner surfaces 16 and 16A respectively. These key recesses are adpated to seat a hinge 28 (FIG. 2) in keyed relationship and with the inner exposed surface thereof substantially flush with the inner surfaces 16 and 16A of the frame 10 and temple 12. The recesses 26 and 26A define flanges 27 and 27A intermediate the channels 14 and 14A and inner surfaces 16 and 16A respectively. The left-hand end of transverse slots 18 and 18A of the T-slots 20 and 20A terminate at the left-hand ends of the recesses 26 and 26A or may terminate short of the left-hand end of recesses 26 and 26A, thereby defining the flanges 27 and 27A to be of substantially U-shaped configuration surrounding the transverse slots 18 and 18A respectively.

The T-slots 20 and 20A respectively are adapted to receive in sliding relationship a concealed or hidden, substantially T-shaped in cross-section hinge plate generally indicated by the numeral 30. Hinge plate 30 has an enlarged flat head portion 31 and a transverse upright shank portion 32 which terminates short of the front or left-hand edge of the head portion 31 to provide a front portion 36 of the head 31. A pair of spaced rivets 34 are formed out of the shank portion 32 by machining and are adapted to be received in a pair of spaced bores 35 of hinge 28.

According to the method of constructing my novel hinge construction, the T-slots 20 and 20A are formed in the terminal ends of the frame 10 and temple 12. Before or after forming the T-slots, the key recesses 26 and 26A are formed on the inner surface 16 and 16A.

The hinge plate 30 is then inserted in T-slots 20 and 20A. When the rivets 34 are received in the holes 35 of the hinge 28 and the hinge 28 is seated in the recesses 26 and 26A, the head 31 of plate 30 underlies the flange 27 and the front portion 36 of head 31 is received in the left-hand end of channel 14 beyond the left-hand end 22 of transverse slot 18 as illustrated in cross-section in FIG. 4.

The terminal ends of the rivets 34 are then formed into rivet heads 37 (FIGS. 4 and 5) thereby interconnecting the hinge 28 and hinge plate 30 in keyed and locked relationship with the frame 10 and temple 12.

It will be noted from the sectional view (FIG. 4) that the upper surface of the shank portion 32 of the hinge plate 30 terminates short of the upper surface of the flange 27 and is spaced below the lower surface of the hinge 28. This construction defines an open space remaining intermediate the upper surface of the head 31 of the hinge plate 30 and the lower surface of the hinge 28 even after the rivet heads 37 are formed, the purpose of which is to provide compressional force between the hinge 28 and hinge plate 30 against the flange 27 (see FIG. 5) when the rivet heads 37 are formed thereby greatly increasing the rigidity and strength of the construction. It will be understood that in this manner, should the front hinge become loose on the rivets, through accident, excessive use, or during heat treatment for insertion of the lens, the rivets may be tightened by re-riveting to restore them to the original firmness and compression will again be exerted on the flange 27.

Thereafter, I insert two plastic filler strips 38 and 40 in the undercut channels 14 and 14A and transverse slots 18 and 18A respectively, thereby filling the vacant spaces in the T-slots 20 and 20A. The fillers are cemented within the slots to strengthen my construction and improve the appearance thereof. Thereafter the terminal end 17A of temple 12 is ground and polished. However, the corresponding terminal end 17 of the frame 10 is milled or otherwise machined to remove the broken line portion 45 of FIG. 2 thereby to define a terminal wrap-around or flap portion 46.

Flap 46 is heated until softened and is then wrapped around and cemented or otherwise bonded to an exposed end 48 of frame 10. This construction provides an improved aesthetic appearance and a stronger construction. The terminal end 17 of the flap or wrap-around portion 46 and an upper edge 50 of filler strip 40 are then machined and polished to provide a finished surface.

While I have shown and described the preferred form of mechanism of my invention it will be apparent that various modifications and changes may be made therein particularly in the form and relation of parts, without departing from the spirit of my invention as set forth in the appended claims.

I claim:
1. In an improved spectacle hinge construction for at least one of a spectacle frame member or spectacle temple member,
   (a) a hinge,
   (b) a hinge plate,
   (c) an undercut channel formed at one end of said one member adapted to receive said hinge plate,
   (d) a recess formed in an inner face of said one member defining a flange between said channel and said inner face, and
   (e) means for interconnecting said hinge and hinge plate and for applying compressional force therebetween to said flange.

2. In an improved spectacle hinge construction for at least one of a spectacle frame member or spectacle temple member,
   (a) a hinge,
   (b) a hinge plate having a head portion and a shank portion substantially T-shaped in cross-section,
   (c) an undercut T-shaped slot formed at one end of said one member adapted to receive said hinge plate,
   (d) a recess formed in an inner face of said one member defining a flange between said channel and said inner face, and
   (e) means for interconnecting said hinge and hinge plate and for applying compressional force therebetween to said flange.

3. In an improved spectacle hinge construction for at least one of a spectacle frame member or spectacle temple member,
   (a) a hinge,
   (b) a hinge plate,
   (c) an undercut channel formed at one end of said one member adapted to receive said hinge plate,
   (d) a key recess formed on an inner face of said one member adapted to receive said hinge in keyed relationship, and
   (e) means interconnecting said hinge and hinge plate when said hinge is received in said recess and said hinge plate is received in said channel thereby locking said hinge and hinge plate in position.

4. In an improved spectacle hinge construction for at least one of a spectacle frame member or spectacle temple member,
   (a) a hinge,
   (b) a hinge plate,
   (c) an undercut channel formed at one end of said one member adapted to receive said hinge plate,
   (d) a key recess formed on an inner face of said one member adapted to receive said hinge in keyed relationship, and
   (e) means for interconnecting said hinge and hinge plate when received in said recess and channel respectively and for applying compressional force therebetween to a flange formed on said one member and defined by said channel and recess.

5. In an improved spectacle hinge construction for at least one of a spectacle frame member or spectacle temple member,
   (a) a hinge,
   (b) a hinge plate having a head portion and a shank portion and being substantially T-shaped in cross-section,
   (c) an undercut T-shaped slot formed at one end of said one member and being adapted to receive said hinge plate,
   (d) means for interconnecting said hinge and hinge plate, and
   (e) a filler strip having a T-shaped cross section of the same configuration as said slot, said filler strip extending partially into at least a portion of said slot from said one end.

6. In an improved spectacle hinge construction for at least one of a spectacle frame member or spectacle temple member,
   (a) a hinge,
   (b) a hinge plate having a head portion and a shank portion and being substantially T-shaped in cross-section, (c) an undercut T-shaped slot formed at one end of said one member and being adapted to receive said hinge plate,
(d) means for interconnecting said hinge and hinge plate, and
(e) a filler strip extending partially into at least a portion of said slot from said one end, and a terminal wrap-around portion formed at an outer surface of said one end of said one member for facing said one end.

7. In an improved spectacle hinge construction for at least one of a spectacle frame member or spectacle temple member,
(a) a hinge,
(b) a hinge plate having a head portion and a shank portion and being substantially T-shaped in cross-section,
(c) an undercut T-shaped slot formed at one end of said one member and being adapted to receive said hinge plate,
(d) a key recess formed on an inner face of said one member adapted to receive said hinge in keyed relationship, and
(e) means for interconnecting said hinge and said shank portion of said hinge plate when said hinge is received in said recess thereby locking said hinge and hinge plate in position.

8. In an improved spectacle hinge construction in accordance with claim 7 in which said shank portion includes a pair of rivets adapted to be received in said hinge.

9. In an improved spectacle hinge construction in accordance with claim 7 in which a shank portion of said slot and said hinge plate shank respectively terminates short of a head portion of said slot and said hinge plate head.

10. An improved method of constructing a hinge for at least one of a spectacle frame or spectacle temple member, comprising the steps of:
(a) forming an undercut channel at one end of said one member adapted to receive a hinge plate,
(b) forming a key recess on an inner face of said one member adapted to receive a hinge,
(c) inserting a hinge plate in said channel,
(d) inserting a hinge in said key recess, and
(e) interconnecting said hinge and hinge plate in a manner locking said hinge and hinge plate respectively in said key recess and channel.

11. An improved method of constructing a hinge for at least one of a spectacle frame or spectacle temple member, comprising the steps of:

(a) forming an undercut substantially T-shaped slot at one end of said one member adapted to receive a hinge plate of substantially T-shape cross-section,
(b) forming a key recess on an inner face of said one member adapted to receive a hinge,
(c) inserting a hinge plate in said slot,
(d) inserting a hinge in said key recess, and
(e) interconnecting said hinge and hinge plate in a manner locking said hinge and hinge plate respectively in said key recess and channel.

12. An improved method of constructing a hinge for at least one of a spectacle frame or spectacle temple member, comprising the steps of:
(a) forming an undercut substantially T-shaped slot at one end of said one member adapted to receive a hinge plate of substantially T-shaped cross-section,
(b) inserting said hinge plate in said slot,
(c) interconnecting said hinge and hinge plate, and
(d) filling an open end of said slot with a filler strip having a T-shaped cross section of the same configuration as said slot thereby locking said hinge and hinge plate in a selected position relative to said slot.

13. An improved method of constructing a hinge for at least one of a spectacle frame or spectacle temple member, comprising the steps of:
(a) forming an undercut substantially T-shaped slot at one end of said one member adapted to receive a hinge plate of substantially T-shaped cross-section,
(b) inserting said hinge plate in said slot,
(c) interconnecting said hinge and hinge plate, and
(d) filling an open end of said slot thereby locking said hinge and hinge plate in a selected position relative to said slot, and including a step of forming a terminal wrap-around portion or an outer surface of said one end of said one member and facing said one end with said terminal wrap-around portion.

References Cited

UNITED STATES PATENTS 3,241,904   3/1966   Ditto _____ 351—153

FOREIGN PATENTS 947,276   1/1964   Great Britain.

MARVIN A. CHAMPION, *Primary Examiner.*

EDWARD C. ALLEN, *Examiner.*

D. L. TROUTMAN, *Assistant Examiner.*